Figure 1:
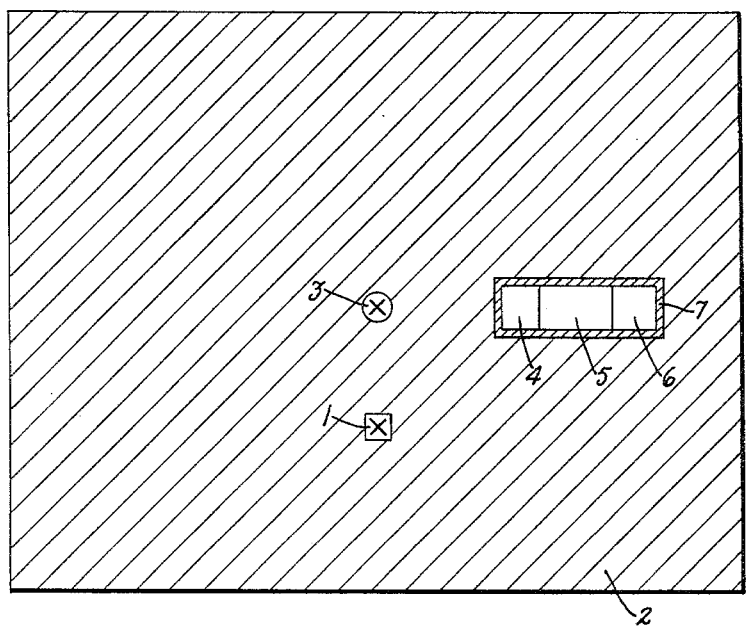

Feb. 8, 1966  V. V. VERBINSKI  3,234,387
APPARATUS FOR IDENTIFYING MATERIALS BY ACTIVATION ANALYSIS
Filed Jan. 3, 1962

Inventor:
Victor V. Verbinski,
by Paul A. Frank
His Attorney.

10

United States Patent Office 3,234,387
Patented Feb. 8, 1966

3,234,387
APPARATUS FOR IDENTIFYING MATERIALS
BY ACTIVATION ANALYSIS
Victor V. Verbinski, Oak Ridge, Tenn., assignor to General Electric Company, a corporation of New York
Filed Jan. 3, 1962, Ser. No. 164,013
2 Claims. (Cl. 250—83.3)

My invention relates to a method and apparatus for activation analysis to measure the amount of some element in the presence of others, and in particular, to an apparatus wherein the effect of the normal undesired background radiation encountered is reduced to a large extent thereby resulting in a more sensitive measurement of the radiation which identifies the particular element.

It is often required to measure the amount of some element in the presence of others in materials without affecting the bulk properties of the material either physically or chemically. Typical examples of this application are the prospector type of search for an element, oil-well logging and the determination of percentage abundance and uniformity of distribution of an element in a test piece. A convenient approach to this problem is the technique of activation analysis which may be defined as a method of chemical analysis based on the detection of characteristic radionuclides following a nuclear bombardment. In this method, the sample in question is irradiated, producing radioactive isotopes that can be detected and identified by the type, the decay time, and the energy spectrum of the radioactivity induced. The sample is then removed from the radiation field and placed under a radiation detector that measures the energy and amount of residual radioactivity produced, as well as half-life. This trace of radioactive isotope in turn refers back to the element from which it was produced and the amount of radioactivity produced under known conditions becomes a measure of the amount of parent element contained in the sample under test.

In many cases the usual approach to activation analysis is not possible because the radioactivity produced may not be energetic enough to be detected easily, or it may have a very short half-life, or the parent isotope may have a low cross section (probability) for production of the particular type of radioactivity being detected. In these cases the identification of the parent element may be facilitated by measuring the prompt gamma radiation that follows the capture of a neutron by the element. When the nucleus of an element is bombarded by neutrons and captures a neutron, the resultant isotope may emit some gamma radiation immediately following the capture event. This prompt gamma radiation is generally of very high energy and therefore very penetrating. The energy spectrum of this neutron-capture prompt gamma radiation characterizes the element irradiated and this spectrum is often quite favorable for the detection of this element in the presence of others since many isotopes exhibit a prompt gamma radiation spectrum wherein the energies of some of the strong gamma radiation lines are far removed from those of other elements. The major difficulty in measuring the prompt gamma radiation spectra lies in the excessively large background radiation encountered, the background being defined as the counting rate observed with the neutron source, counter, and all surrounding media in place but with the element in the sample under investigation removed from the region of the experiment.

One of the principal objects of this invention is to develop an improved method to measure the amount of an element in the presence of others by prompt gamma radiation.

Another object of this invention is to develop an improved method for reducing the effect of background radiation encountered when measuring prompt gamma radiation.

A further object of this invention is to provide an improved apparatus for measuring the amount of an element in the presence of others.

A still further object of this invention is to provide an improved apparatus for the detection of prompt gamma radiation following neutron capture and the reduction of the background radiation encountered.

In accordance with my invention, a method and apparatus for activation analysis is employed in which short duration pulses of an incident radiant energy are generated, these pulses irradiating the material to be identified. The resultant irradiation causes an emitted radiation from the material and an appropriate detector senses this emitted radiation. The detector is shielded from radiation originating from sources other than the material to be identified and a gated counting circuit is coupled to the output of the detector to further minimize the effects of induced radioactivity caused by other reaction products. The shielding of the detector and the use of a gated counting circuit both aid in reducing the effect of the undesired background radiation and thereby result in a more sensitive measurement of the radiation which identifies the particular element.

In the particular case of activation analysis by the measurement of prompt gamma radiation, a pulsed beam of fast neutrons is generated in a moderator material to produce short duration pulses of thermal neutrons. The thermal neutrons upon irradiating the bulk material to be identified, cause an emission of prompt gamma radiation which is detected by a scintillation spectrometer of high sensitivity to indicate the amount of an element admixed with others in the bulk material. The bothersome background radiation arises from neutron capture gamma radiation in the crystal of the scintillation spectrometer and surrounding medium. A feature of the invention which is useful in the fulfillment of the above enumerated objects consists of shielding the detector crystal from thermal neutrons thereby eliminating the prompt gamma radiation due to neutron capture events within the crystal. A further feature of the invention consists of coupling the output of the detector to an electronically gated counting circuit and controlling the time the gate opens and remains open to permit the counting circuit to measure only the prompt gamma radiation arising from the original thermal neutron pulses, thereby minimizing the effects of induced radioactivity caused by other reaction products to reduce the background radiation still further.

Figure 2:
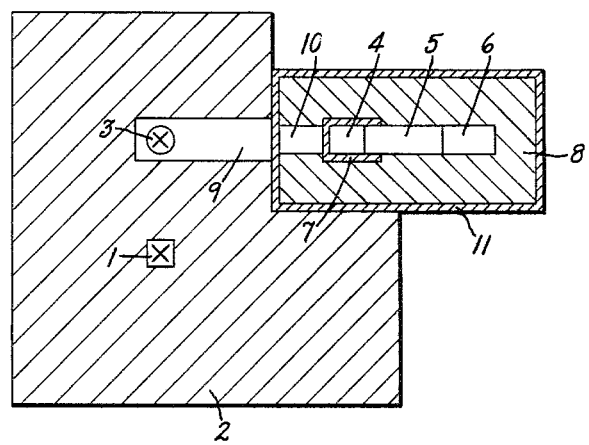

My invention together with further objects, and advantages thereof may best be understood by reference to the following description when considered in connection with the accompanying drawings wherein like parts in each of the two figures are identified by the same reference character and wherein:

FIGURE 1 is a diagrammatic view illustrating the apparatus embodiment of this invention; and FIGURE 2 is a diagrammatic view illustrating a more elaborate apparatus embodiment of this invention.

The dependence of neutron processes on energy has led to the universal use of the terms fast, slow, and thermal to indicate broad ranges of neutron kinetic energy. Fast neutrons have energies greater than some arbitrarily lower limit of approximately 10,000 electron volts (.01 mev.). Slow neutrons are those with energies less than such value, and included in this group are thermal neutrons which have kinetic energy of about .025 ev. Since neutrons are emitted in nuclear reactions with kinetic energies of the order of 1 mev., neturons from most sources are fast. The radioactive capture cross section for neutrons (probability that electromagnetic radiation such as gamma rays will follow neutron capture in a particular nucleus) is very small for fast neutrons, while it is much greater for thermal neutrons. Therefore, it is necessary to reduce the more readily available fast neutrons to thermal neutrons and this is achieved in a short interval of about $10^{-4}$ seconds by passing the fast neutrons through a moderator material. With a properly selected moderator material, the neutrons spend the major part of their lifetime, about $10^{-3}$ seconds, in the thermal energy range before they are absorbed by capture or escape. This lifetime, determined essentially by neutron capture, has no connection with the lifetime of a neutron free from matter which is 5–15 minutes. As a result of the aforementioned properties of fast and thermal neutrons, in order to identify an element by prompt gamma radiation, the first step is to generate a pulsed beam of fast neutrons in a moderator, each pulse having a duration of approximtely $10^{-4}$ seconds. During an interval of about another $10^{-4}$ seconds following each fast neutron pulse, the fast neutrons are slowed down to thermal velocities and reduced to pulses of thermal neutrons in the region wherein is located the material to be identified. These thermal neutron pulses, upon striking the material to be identified, cause an emission of propt gamma radiation from the material, which is detected by a sodium iodide crystal. Approximately $10^{-4}$ seconds after the end of each fast neutron pulse, an electronic gate in a counting circuit that is coupled to the output of the detector, is opened for an interval of about $10^{-3}$ seconds, thereby measuring the effects of the thermal neutrons alone, discounting the effects of any other induced radioactivity that will be treated subsequently.

Considering now in detail the structure illustrated in FIGURE 1, a pulsed fast neutron source is indicated at 1. When this fast neutron source is actuated, pulses of fast neutrons are generated which pass through a moderator material 2 and within approximately $10^{-4}$ seconds are reduced to thermal neutrons. These thermal neutrons on striking the material to be identified 3, cause the material to emit prompt gamma radiation due to the event of thermal neutron capture. This prompt gamma radiation is detected by a scintillation spectrometer of high sensitivity comprising a sodium iodide crystal 4 that is activated with a trace of thallium to produce emission of a deep blue light to which a phototube is most sensitive. The phototube 5 senses the output of radiation detector 4 and the output of the phototube is coupled to a preamplifier, amplifier, and an electronically gated counting circuit designated as a whole by numeral 6 to thereby measure the effects of the thermal neutrons alone. The moderator material 2 contains carbon, oxygen or deuterium, and is of low thermal neutron capture cross section (small probability of thermal neutrons being captured by the elements comprising the moderator material). Therefore the probability of causing prompt gamma radiation form the moderator material itself is very small, thereby producing a low prompt gamma radiation background from this source. Since only thermal neutrons theoretically exist in the moderator material at some distance from the fast neutron source, and these thermal neutrons could strike the crystal 4 directly and develop prompt gamma radiation following neutron capture events within the crystal itself, a thin thermal neutron shield 7 preferably of lithium, or boron is placed about the crystal 4 to eliminate this source of undesirable background radiatioin. The presence of iron, nitrogen and hydrogen has been detected by employing this method of activation analysis.

The more elaborate structure of FIGURE 2 utilizes a gamma radiation shield 8 of low thermal neutron capture cross section such as bismuth which also has a low prompt gamma radiation yield, to further reduce the background radiation. Any high Z (atomic number) material will be effective as a gamma radiation shield since heavy atoms are very ineffective in slowing down neutrons, and the probability of producing prompt gamma radiation from a fast neutron interaction is very small. The purpose of the gamma radiation shield is to shield the crystal 4 from gamma radiation which originates from sources other than the material to be identified such as the moderator material 2. Therefore, material 8 is a collimated gamma radiation shield so disposed that the crystal 4 essentially views only the gamma radiation from the material 3 to be identified, plus some moderator material behind it, sections 9 and 10 being voids. A second lithium shield 11 surrounds the collimated gamma radiation shield 8. The purpose of this second lithium shield is to prevent any thermal neutrons from entering the region of the gamma radiation shield 8 to further reduce the probabiltiy of prompt gamma radiation originating therein. The radiation detector 4, phototube 5, preamplifier, amplifier, and gated counting circuit 6, and thermal neutron shield 7, function in the same manner as disclosed in FIGURE 1. Since there are no known thin shields which are effective against fast neutrons, the lithium shield 7 shields the crystal from any fast neutrons which failed to become thermalized in the moderator and which pass through the second lithium shield 11 and are reduced to thermal neutrons in the gamma radiation shield by inelastic scattering, for example.

Reaction products from the initial neutron burst which have a half-life duration of less than $10^{-4}$ seconds are discriminated against because they have mostly decayed before the counting circuit is turned on. Reaction products from thermal neutrons whose half-life may be shorter than several milliseconds are not discriminated against. However, a survey of a chart of nuclides reveals that a very small number of these exist that can be produced by simple reactions. Even these few nuclides would not be bothersome unless they yielded gamma radiations, and then only if these gamma radiations have energies near or about the prompt gamma radiations being measured. If radioactivity is produced of half-life greater than a few milliseconds, this can be discriminated against by two methods. First, the off-time of the counting circuit and correspondingly the time between neutron pulses can be made much longer than the on-time of about $10^{-3}$ seconds. Second, with long half-life radioactivities, the duration of the experiment can be made short compared with the half-life (the half-life build-up time) of this bothersome radioactivity. Biasing out the short-lived radioactivity (which is mostly below 2 mev. as compared to about 11 mev. for prompt gamma radiation from neutron capture) to detect only prompt gamma radiation, places the prompt gamma radiation measurement in an entirely different energy region from short-lifetime gamma radiation measurement.

The pulsed beam method described herein can be extended to cover more than prompt and short-lived gamma radiation measurement and can include any prompt and short-lived radiation such as beta particles by selecting a suitable source of incident energy such as protons, deutrons or alpha particles in pulse form, the necessary detector to sense the radiation in question, the required shielding needed to reduce the effect of undesired radiation, and finally the proper time sequence for operation of the gated counting circuit.

Other means for reducing the background radiation are to employ a more powerful source of incident pulsed radiation that can be collimated, and a detector of greater crystal volume.

From the foregoing description it can be appreciated that the invention makes available a new and improved method of reducing background radiation that is encountered when measuring prompt gamma radiation spectra by the employment of a pulsed fast neutron source and an electronic gate in the counting circuit which remains open for a predetermined length of time to measure only the prompt gamma radiation. The use of thermal neutron and gamma radiation shielding around the detector further reduces the undesirable background radiation. Having described a new and improved method and apparatus for reducing undesirable background radiation while measuring prompt gamma radiation, it is believed obvious that modifications and variations of the invention are possible in light of the above teachings. This invention is not limited to prompt gamma radiation measurement and short-lived gamma radiation but will include all prompt and short-lived radiations with the selection of appropriate components. It is, therefore, to be understood that changes may be made in the particular embodiment of the invention described which are within the full intended scope of the invention as defined by the following claims.

What I claim as new and desire to secure by Letters Patent of the United States is:

1. Apparatus for identifying materials by prompt gamma radiation and reducing background radiation comprising a source of fast neutrons, means to produce pulses of fast neutrons from said source, a moderator of low thermal neutron capture cross section surrounding said source whereby the fast neutrons are reduced to pulses of thermal neutrons in a short time, a material to be identified positioned within a particular space substantially surrounded by said moderator and spaced from said neutron source, said material emitting a prompt gamma radiation characteristic of said material on being irradiated by said thermal neutrons, a gamma radiation detector located near said material, shielding means surrounding said detector to reduce radiation sensed by the detector and originating from sources other than the material to be identified, said shielding means comprising a first shield of high thermal neutron capture cross section located directly about said detector, a second shield being a collimated gamma radiation shield located immediately outside said first shield and so disposed as to permit said detector to respond to gamma radiation emitting only from the direction of said material, and a third shield of high thermal neutron capture cross section surrounding said second shield, and a gated counting circuit being coupled to the output of said detector to further minimize the effects of induced radioactivity caused by other reaction products.

2. The apparatus set forth in claim 1 wherein said first and third shields are composed of lithium and said second shield is composed of bismuth.

References Cited by the Examiner
UNITED STATES PATENTS

| | | | |
|---|---|---|---|
| 2,938,119 | 5/1960 | McKay | 250—71.5 |
| 3,011,056 | 11/1961 | Gale | 250—71.5 |
| 3,146,349 | 8/1964 | Jordon | 250—71.5 |
| 3,102,956 | 9/1963 | Armistead | 250—71.5 |

References Cited by the Applicant
UNITED STATES PATENTS

| | | |
|---|---|---|
| 2,288,718 | 7/1942 | Kallmann et al. |
| 2,464,930 | 3/1949 | Herzog. |
| 2,476,810 | 7/1949 | Brunner et al. |
| 2,481,964 | 9/1949 | Wollan. |
| 2,515,502 | 7/1950 | Fearon et al. |
| 2,680,201 | 6/1954 | Scherbatskoy. |
| 2,691,741 | 10/1954 | Swift. |
| 2,721,944 | 10/1955 | Ruble. |
| 2,796,411 | 6/1957 | Zirkle et al. |
| 2,863,062 | 12/1958 | Sturm. |

RALPH G. NILSON, *Primary Examiner.*

J. W. LAWRENCE, *Assistant Examiner.*